United States Patent

Bianca, Jr.

[11] Patent Number: 5,997,973
[45] Date of Patent: Dec. 7, 1999

[54] ARTICULATING THERMAL MEMBRANE WITH INTEGRAL HINGES

[75] Inventor: Daniel M. Bianca, Jr., Los Angeles, Calif.

[73] Assignee: Hughes Electronics Corporation, El Segundo, Calif.

[21] Appl. No.: 08/972,601

[22] Filed: Nov. 18, 1997

[51] Int. Cl.[6] ...................................... B32B 3/00
[52] U.S. Cl. .............................. 428/57; 244/121; 428/68; 428/70; 428/71; 428/74; 428/76; 428/121; 428/194; 428/408
[58] Field of Search .................................. 428/57, 68, 70, 428/71, 74, 76, 121, 194, 408; 244/121

[56] References Cited

U.S. PATENT DOCUMENTS 4,789,574  12/1988  Selvey ........................................ 428/56

OTHER PUBLICATIONS

Van Nostrand's Scientific Encyclopedia, Seven Edition, Douglas M. Considine, P.E. Editor, Van Nostrand Reinhold, New York, 1989, at p. 1336.

*Primary Examiner*—Nasser Ahmad
*Attorney, Agent, or Firm*—Georgann S. Grunebach; M. W. Sales

[57] ABSTRACT

A barrier membrane for use with articulating mechanical devices includes hinges formed along preferred folding lines. The hinges encourage the membrane to fold in a predetermined manner in response to articulation of the mechanical device. In a preferred embodiment, the membrane is composed of flexible outer thermal layers encasing rigid panels that are spaced apart from each other at the hinges.

21 Claims, 2 Drawing Sheets

ARTICULATING THERMAL MEMBRANE WITH INTEGRAL HINGES

This invention was made with Government support under Contract No. F 04701-92-C-0049 awarded by the United States Air Force. The Government has certain rights in this invention.

BACKGROUND OF THE INVENTION

1. Field of the Invention

The invention relates to the field of thermal barriers, and in particular to thermal barriers for use with articulating joints.

2. Description of the Related Art

Thermal membranes are employed by nearly all space-based systems to buffer the system from the extremes of temperature resulting from variable insolation. Whether the space-based system is a satellite with a relatively long term orbit or a launch and recover spacecraft, vital components must be protected from the strain created by variable insolation. That is, a satelite with one side exposed to direct sunlight and the other side completely in shadow would be subjected to extreme mechanical stresses due to the sharp temperature differences between the exposed and shadowed sides. A thermal "blanket" is typically employed to moderate these temperature differences.

Conventional thermal blankets are formed of several layers of isolation such as Kapton™ material, at least one of which includes a layer of vacuum deposited aluminum (VDA). Kapton is the Trademark for a relatively strong, light weight, flexible material (available from E.I. Dupont Demours, Wilmington, Del.) that, in addition to the above laudatory qualities, exhibits very little out-gassing. This absence of outgassing is critical to sensitive applications which might otherwise be contaminated by outgassing in the vacuum of space.

A thermal blanket typically encloses the system and, because the VDA is highly reflective, significantly reduces solar heating, thus permitting an internal thermal control system to determine the temperature of sensitive instruments and electronic components, for example. Conventional thermal blankets are light weight, flexible and resilient. In fact, recognizing their advantages, less expensive versions of the thermal blankets developed for space systems applications have been developed for use by athletes such as marathoners who compete in cool weather. Runners are handed these ethereal films to wrap themselves in at the end of a race. The VDA serves to reflect body heat back into the runner, thereby helping to maintain the runner's core body temperature.

Although such conventional thermal blankets prove useful in a number of applications, they are not without their problems. In applications in which the blankets enclose a movable mechanical device, e.g., a gimbal mounted satellite antenna, great care must be taken during assembly of the satellite to ensure that the blanket does not interfere with the movement of the antenna. Consequently, the blankets are typically made substantially larger than the enclosed device and then hand-fitted during assembly. That is, technicians must carefully enclose the devices to be protected by the blanket, "fluff" the blanket to create a free movement path for the enclosed devices, and then, after determining that the blanket will not get "caught-up" in the assembly's moving parts such as worm gears used to position a satellite antenna, then hand-sew the blanket in place.

Not only does this hand-fitting process consume a great deal of time, and consequently money, each stitch in the blanket diminishes its effectiveness by providing a thermally conductive path between the blankets' interior and exterior. Furthermore, because the fitting process requires that the blankets be handled a great deal, they are often torn during the process and must be repaired or replaced. Not only does this compound the expense of the blankets; it also tends to diminish the blankets' effectiveness since some tears go undetected. Furthermore, due to its flexibility, it is extremely difficult to predict where the blanket may fold after repeated flexing and it may still "hang up" on, or get caught up in, a portion of the moving assembly which it enshrouds, thereby jamming the mechanism or tearing. There is also the danger that fitted corners will act as points of stress concentration where, after some portion of the typically 50,000 specified repeated flexings, the material will simply break down.

Additionally, in spite of the careful selection of materials and painstaking construction, conventional thermal blankets tend to be more massive than desirable. Since there is a strong possibility that one or more layers of the blanket may be torn during assembly of the spacecraft, more of the material is used than would be ideal. Mass is a critical issue in all space-based applications because of the difficulty associated with accelerating an object outside the grasp of the Earth's gravitational pull. But in applications in which a thermal blanket encloses a moving mechanism such as a gimbal mount, the blanket's mass, or lack thereof, also has a crucial effect upon the mobility of the gimbal. A too-massive thermal blanket, one which imparts too much torque resistance to an enclosed gimbal, will impede the gimbal's motion so that an antenna or instrument attached to the gimbal may be misdirected or it may not even deploy properly.

SUMMARY OF THE INVENTION

The invention is directed to a light-weight thermal barrier membrane which imposes very little drag upon an associated articulated joint. The new barrier also reduces the risk of tearing and the likelihood that a portion of the barrier could get caught-up in the joint as it moves.

The invention comprises two continuous layers of relatively flexible isolation material with at least two panels of relatively rigid isolation material interposed between the layers of flexible material. The relatively rigid panels are separated from one another by a narrow gap which forms an integral hinge within the thermal membrane. More panels can be used to produce additional hinges. The thermal membrane accommodates itself to the motion of mechanical devices to which it may be attached or which it may enclose.

In a preferred embodiment the membrane is designed for use with gimbal-mounted devices such as an antenna that is joined to a satellite through a gimbal mount. In this embodiment, the flexible layer of isolation material closest to the enclosed gimbal includes sheets of material such as Kapton film with vacuum deposited aluminum, while the layer further from the gimbal includes a sheet of stronger isolation material such as reinforced carbon filled Kapton film. The rigid panels are formed of one or more relatively thick layers of carbon filled isolation material such as Kapton film and held in place by fasteners which penetrate all layers of the membrane. Additionally, fasteners, hook and pile fasteners such as Velcro in the preferred embodiment, affix the membrane to the structure of the gimbal mounted device. A support frame attached to the gimbal mounted device and to a base from which the device is suspended may be included to support the thermal barrier. Generally, separate multi-paneled thermal membranes are used for the different sides of an enclosure, and an additional barrier is employed at each corner of the enclosure to overlap the two membranes which meet but are not joined there.

These and other features, aspects and advantages of the invention will be apparent to those skilled in the art from the following detailed description, taken together with the accompanying drawings.

DETAILED DESCRIPTION OF THE INVENTION

The new multi-panel thermal membrane incorporates an integral hinge between relatively rigid panels. The hinge allows the membrane to flex and fold in a predictable manner, thereby permitting a thermal membrane design which, with some degree of certainty, greatly reduces the possibility of damage to the thermal membrane resulting from contact with an enclosed mechanism or interference with the enclosed mechanism's operation. The panels, composed primarily of the same material as the rest of the membrane, do not add significant weight to the membrane and, in spite of their relative rigidity, do not impart additional torque resistance to the enclosed mechanism.

Figure 1:
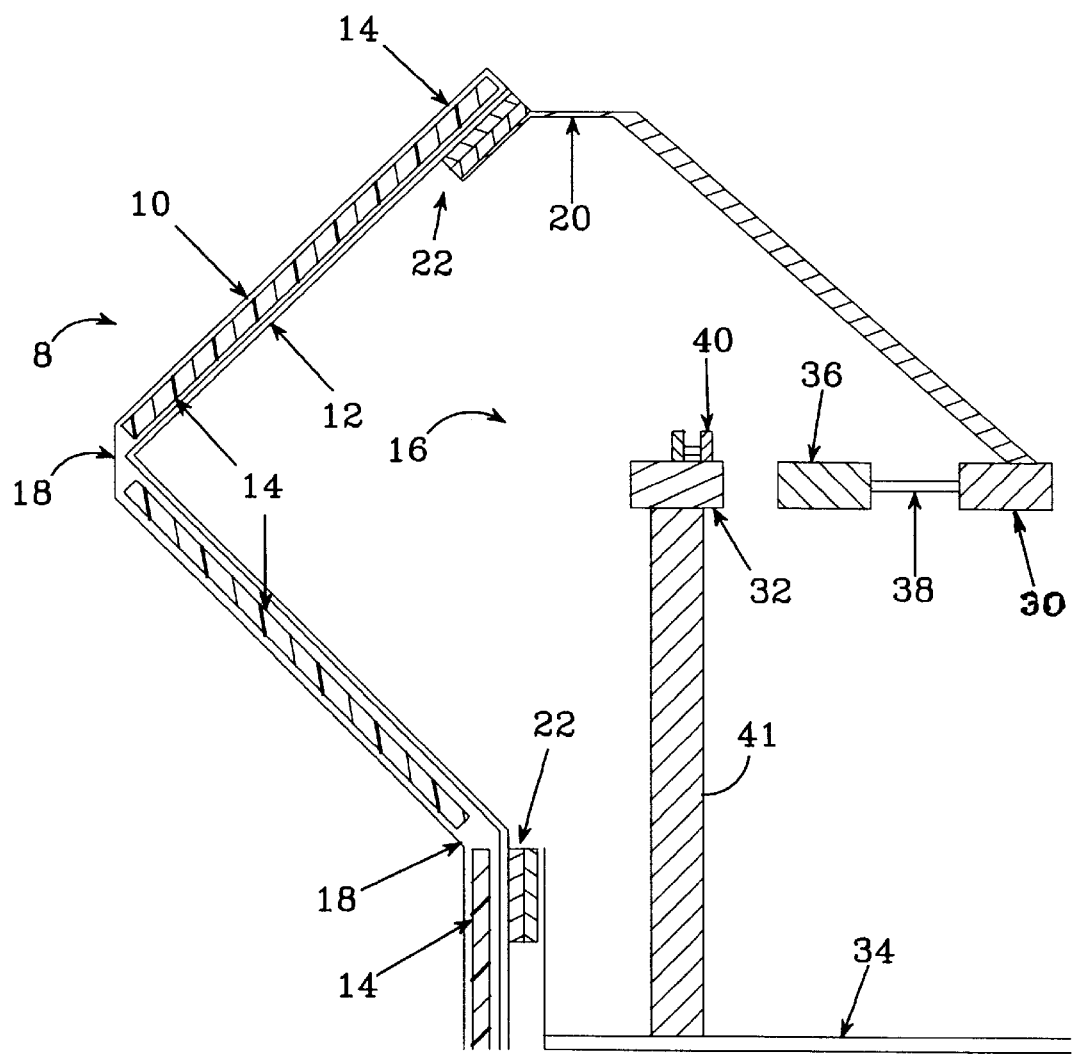
FIG. 1 is a sectional view of a new multi-panel thermal membrane.

The cross-sectional view of FIG. 1 illustrates the various layers of a new thermal membrane 8. In general, the membrane includes two relatively flexible continuous layers of isolation material 10, 12 sandwiching relatively rigid panels 14. In this exemplary embodiment, the layer 12 is on the side of the membrane 8 facing the mechanism to be protected 16 and this layer will be referred to as the interior layer for convenience. The other layer 10 will be referred to as the exterior layer. Successive panels 14 are separated by narrow gaps and, since both the interior and exterior layers 12 and 10 are flexible, these gaps create areas of preferred flexing which, in effect, constitute hinges 18 that are integral to the thermal membrane 8.

In this preferred embodiment, the membrane 8 is attachable to a frame 20 which surrounds the mechanism 16 and moves along with the moving portions of the mechanism 16. Hook and pile fasteners such as Velcro fasteners 22 attach the membrane 8 to the frame 20. The hook and pile fasteners 22 may be attached to the membrane 8 with any of a variety of fasteners but, for convenience and cost savings, staples (23 in FIG. 2) are used in the preferred embodiment. The mating portion of the hook and pile fasteners 22 is attached to the frame 20 by adhesives.

The multi-gimbal systems to which the invention pertains are configured, generally, as illustrated in FIG. 1 in which one side of an enclosed gimbal mechanism is illustrated. Typically, gimbal-mounted instruments are affixed to a platform 30 suspended from a multi-gimbal suspension system. The multi gimbal suspension system provides isolation in two orthogonal axes from a host spacecraft's movement. Gimbals are well known in the art. A brief discussion of them may be found in Van Nostrand's Scientific Encyclopedia, Seventh Edition, Douglas M. Considine, P. E. Editor, Van Nostrand Reinhold, New York, 1989, at page 1336.

The outer ring 32 of a gimbal is attached to a host spacecraft, frequently a satellite. To point the platform 25 in the direction required by platform-based instruments, the satellite maneuvers itself into approximate orientation. Finer posit oning, is achieved by relatively small angular movements of the platform 25 with respect to the base 34 of the satellite. The pivots which suspend the next outermost ring 36 from the outer ring 32 permit the ring 32 to rotate freely about a first axis orthogonal to the plane of the figure and traveling through the center of the platform 25. Similarly, pivots 38 which suspend the platform 30 from ring 36 permit the platform 25 to rotate freely about a second axis lying within the plane of the figure and intersecting the first axis of rotation at the center of the platform 25. A positioner 40, which may comprise a stepper motor for example, operates in cooperation with a toothed member 41 to rotate the gimbal about the first axis and a similar positioner (not shown) rotates the gimbal about the second axis.

One part of the frame 20, referred to for clarity as the top part, is attached to and travels along with the platform 25 as it rotates into position. In the illustration of FIG. 1, the frame 20 has flexed the membrane 8, forcing it to fold outwardly, away from potentially damaging components within the mechanism 16. Should the frame move in the opposite direction, the angle of the hinge 18 would increase, but would not reach 180°. That is, the furthest extension of the frame 20 leaves the membrane 8 bent slightly outward. In this way the membrane 8 is "pre-loaded" to flex outwardly, rather than inwardly, as the frame 20 flexes it.

In the preferred embodiment, the interior layer 12 is composed of two continuous sheets of isolation material, preferably a plastic film such as Kapton™, the innermost approximately 8 microns thick with VDA on both sides and the other approximately 25 microns thick with VDA on one side. As will be discussed in greater detail in relation to FIG. 2, these sheets are held in close proximity to one another by means of a fastener which penetrates and joins all the layers of the thermal membrane, including the panels 14. Additionally, in the preferred embodiment the exterior layer 10 is composed of one sheet of reinforced carbon-filled plastic film such as Kapton™ approximately 25 microns thick and each of the panels 14 is composed of three plys of carbon-filled plastic film such as Kapton™ film, each of which is approximately 130 microns thick. The reinforcing material is preferably a mesh of high temperature plastic fibers such as NOMEX available from the Dupont Corporation. The reinforcing material renders the layer 10 slightly more rigid than it would be without the reinforcing material and, although not done in the preferred embodiment, the reinforcing material may be removed along the hinge 18 to increase the flexibility of the hinge 18. These are attached to one another and to the exterior layer 10 with pressure sensitive adhesive. In the preferred embodiment, the panels 14 and layers 10 and 12 are all attached to one another by staples (23 in FIG. 2), at least four per panel, distributed throughout the membrane 8.

Figure 2:
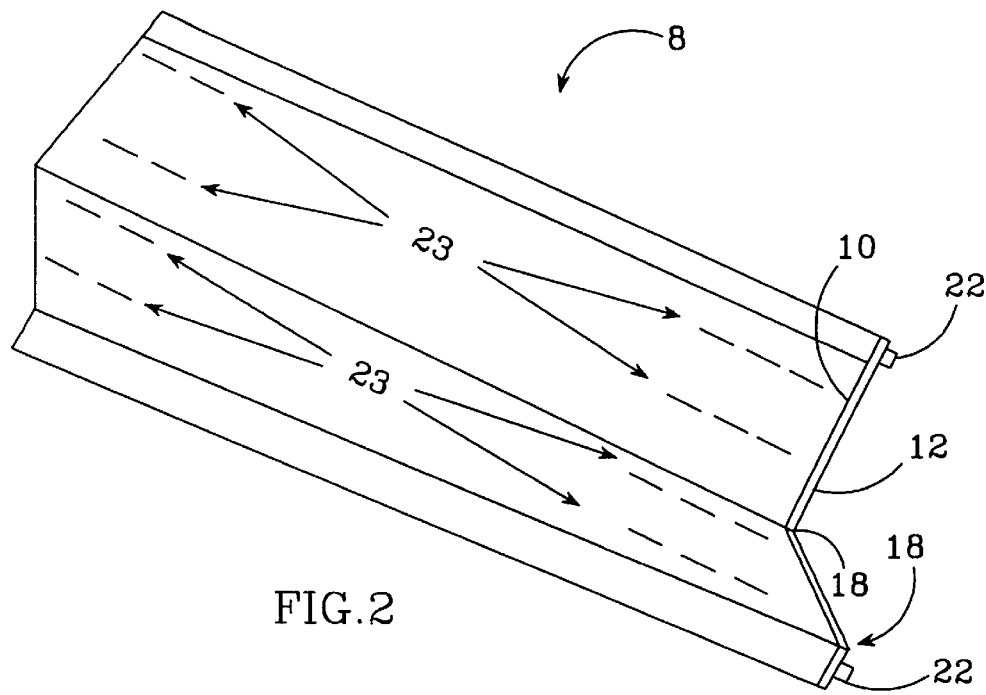
FIG. 2 is a perspective view of the new multi-panel thermal membrane.

FIG. 2 is a perspective view of the new multi-panel thermal membrane 8 with the same components having the same reference designators as in FIG. 1. In the illustration of FIG. 2 the membrane 8 is flexed more at one end than at the other. This variable flexing illustrates the manner in which one of a set of the new membranes can accommodate itself to the motion of an enclosed mechanism such as a gimbal mount. Gimbal mounts permit low-torque positioning of instruments, antennas, cameras, etc. that are located on board a satellite or other spacecraft. Typically, gimbal mounted instruments, antennas, etc. are affixed to a platform supported by a multi gimbal suspension system which provides isolation in two orthogonal axes from a host spacecraft's movements. Since gimbal mounts provide freedom of movement in at least two axes, the membrane 8 must also permit such freedom of movement and does so by bending variably along the length of the membrane as illustrated. As will be discussed in greater detail in relation to FIG. 3, the membrane perimeter need not be straight, as illustrated, but may be shaped to fit a particular application.

Figure 3:
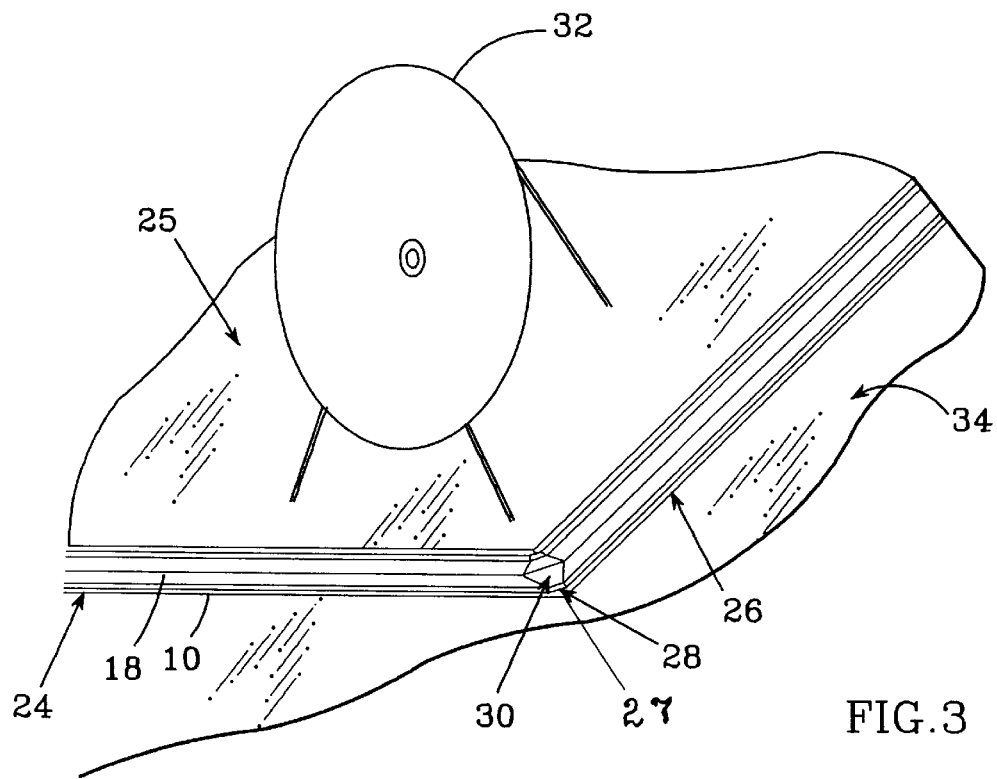
FIG. 3 is a perspective view of one segment of a thermal enclosure composed of eight of the new multi-panel thermal membranes.

FIG. 3 illustrates one corner of a complete enclosure that is composed of a total of eight of the new multi-panel thermal membranes (only three are shown in this view) which extend around the perimeter of an enclosed mechanism. The illustrated enclosure is rectangular, but nearly any shape could be accommodated by a set of the new membranes, overlapped in the manner shown. Since the top and bottom covers 25 needn't flex they could employ conventional thermal membrane materials. Two multi-panel thermal membranes 24 and 26 meet, but are not attached to one another, at a corner of 27 the enlosure 28. At the corner 27 a third, smaller, membrane 30 is located between the two outer membranes 24, 26. In the preferred embodiment, this corner membrane 30 is identical in construction to the outer membranes and is attached to a frame 25 in the same manner as described in relation to FIG. 1. The corner membrane 30 may be tapered at either end to allow the membrane 30 to more closely fit the inside contours of the membranes 24 and 26 as they are flexed outwardly from the enclosed mechanism, a two axis gimbal mount in this example.

In this exemplary embodiment an antenna 32, to which one portion of the frame 25 is attached, is coupled through a gimbal mount (enclosed by the multi-panel membranes) to a satellite 34. Since each of the membranes 24, 26 and 30 is held in place on the frame 20 with hook and pile fasteners, and the panels (14 in FIG. 1) provide some limited degree of rigidity for the membranes, the membranes are rather easily attached to the frame 25 during assembly. Furthermore, this process is repeatable; because similar enclosures may employ similar membranes, membranes may be standardized to some degree and installation will not require the costly custom fitting process required for conventional thermal blankets described in the background section. Furthermore, since the new membranes are predisposed to move away from an enclosed mechanism, there is little risk that the membrane will get hung up on the mechanism during operation. For this reason the new membrane may employ fewer layers of material than conventional membranes, reducing both its mass and torque resistance.

The forgoing description of specific embodiments of the invention has been presented for the purposes of illustration and description. It is not intended to be exhaustive or to limit the invention to the precise forms disclosed, and many modifications and variations are possible in light of the above teachings. For example, corners formed by complete enclosures need not be 90° corners. An enclosure could be formed of more or less sides than the four sides of the exemplary embodiment. The embodiments were chosen and described in order to best explain the principles of the invention and its practical application, to thereby enable others skilled in the art to best utilize the invention. It is intended that the scope of the invention be limited only by the claims appended hereto.

I claim:

1. An articulating thermal membrane, comprising:
   first and second relatively flexible continuous layers of thermal isolation material that are joined together, wherein said first layer includes:
   a) first and second sheets of thermal isolation material, and
   b) vacuum deposited aluminum (VDA) upon at least one side of at least one of said first and second sheets, and wherein said second layer includes at least one sheet of carbon-filled thermal isolation material reinforced with a fiber mesh, and
   at least two panels of relatively rigid carbon-filled thermal isolation material disposed between said first and second layers of flexible isolation material, the panels being separated from one another by a relatively narrow gap which forms a line of preferred bending, or hinge, within the thermal membrane.

2. An articulating thermal membrane comprising:
   first and second relatively flexible continuous layers of thermal isolation material that are joined together, and
   at least two panels of relatively rigid thermal isolation material disposed between said first and second layers of flexible isolation material, the panels being separated from one another by a relatively narrow gap which forms a line of preferred bending, or hinge, within the thermal membrane,
   wherein said first layer of isolation material comprises:
   a first sheet of thermal isolation material approximately 8 microns thick having vacuum deposited aluminum (VDA) upon both sides, and
   a second sheet of thermal isolation material approximately 25 microns thick having VDA upon one side, said first and second sheets held in close proximity to one another by fasteners which penetrate and join all layers of the thermal membrane.

3. The thermal membrane of claim 2, wherein said second layer of isolation material comprises:
   at least one sheet of reinforced carbon-filled thermal isolation material approximately 25 microns thick.

4. The thermal membrane of claim 3, wherein said relatively rigid panels each comprise:
   at least three sheets of reinforced carbon-filled thermal isolation material.

5. The thermal membrane of claim 2, wherein said relatively rigid panels each comprise:
   at least one layer of carbon-filled thermal isolation material approximately 130 microns thick.

6. The thermal membrane of claim 5, wherein said relatively rigid panels comprise:
   three layers of carbon-filled thermal isolation material each of which is approximately 130 microns thick.

7. The thermal membrane of claim wherein said first and second layers of isolation material are sized and spaced from each other to permit the ready operation of said hinge.

8. The thermal membrane of claim 7, wherein one of said first and second layers of isolation material includes sufficient excess material in the neighborhood of said hinge to permit a relatively wide-angle cornering of said hinge.

9. An articulating thermal isolation structure, comprising:
   an articulate mechanical device including at least two constituent parts combined through a movable joint, and
   an articulate thermal membrane forming an overlapping thermal barrier around the perimeter of the device, said membrane, comprising:
   first and second relatively flexible continuous layers of isolation material wherein said first layer includes:
   a) first and second sheets of thermal isolation material, and
   b) vacuum deposited aluminum (VDA) upon at least one side of at least one of said first and second sheets, wherein said first and second sheets are held in close proximity to one another by fasteners which penetrate and join all layers of the thermal membrane, and wherein said second layer includes at least one sheet of carbon-filled thermal isolation material reinforced with a fiber mesh, and at least two panels of relatively rigid thermal isolation material disposed between said first and second layers of flexible isolation material, the panels being separated from one another by a relatively narrow gap which forms a line of preferred bending, or hinge, within the thermal membrane.

10. An articulating thermal isolation structure, comprising:

an articulate mechanical device including at least two constituent parts combined through a movable joint, and an articulate thermal membrane forming an overlapping thermal barrier around the perimeter of the device, said membrane, comprising:

first and second relatively flexible continuous layers of isolation material, and at least two panels of relatively rigid thermal isolation material disposed between said first and second layers of flexible isolation material, the panels being separated from one another by a relatively narrow gap which forms a line of preferred bending, or hinge, within the thermal membrane, where said movable joint is a gimbal mount which joins constituent satellite components.

11. The structure of claim 10, wherein one of said constituent components is an antenna.

12. The structure of claim 11, wherein another of said constituent components is the base of a satellite.

13. An articulating thermal isolation structure, comprising:

an articulate mechanical device including at least two constituent parts combined through a movable joint, and an articulate thermal membrane, comprising:

first and second relatively flexible continuous layers of isolation material, and at least two panels of relatively rigid thermal isolation material disposed between said first and second layers of flexible isolation material, the panels being separated from one another by a relatively narrow gap which forms a line of preferred bending, or hinge, within the thermal membrane, wherein said articulate thermal membrane includes a plurality of articulate thermal membranes attached to form a thermal barrier around the perimeter of said device, with said membranes overlapping so that whenever said membranes are flexed, the openings at corners formed by the junction of any two membranes are blocked by overlapping membranes.

14. An articulating thermal membrane, comprising:

at least two panels of relatively rigid thermal isolation material separated from one another by a relatively narrow gap, and relatively flexible first and second layers of thermal isolation material fastened to opposite sides of the panels to form a hinge between the panels, wherein said first layer includes:

a) first and second sheets of thermal isolation material, and b) vacuum deposited aluminum (VDA) upon at least one side of at least one of said first and second sheets, said first and second sheets held in close proximity to one another by fasteners which penetrate and join all layers of the thermal membrane, and wherein said second layer includes at least one sheet of carbon-filled thermal isolation material reinforced with a fiber mesh.

15. An articulating thermal membrane comprising:

at least two panels of relatively rigid thermal isolation material separated from one another by a relatively narrow gap, and relatively flexible layers of thermal isolation material fastened to the panels to form a hinge between the panels, wherein said first layer of isolation material comprises:

a first sheet of thermal isolation material approximately 8 microns thick having vacuum deposited aluminum (VDA) upon both sides, and a second sheet of thermal isolation material approximately 25 microns thick having VDA upon one side, said first and second sheets held in close proximity to one another by fasteners which penetrate and join all layers of the thermal membrane.

16. The thermal membrane of claim 15, wherein said second layer of isolation material comprises:

a sheet of reinforced carbon-filled Thermal isolation material approximately 25 microns thick.

17. The thermal membrane of claim 15, wherein said second layer of isolation material further comprises:

at least three sheets of reinforced carbon-filled thermal isolation material approximately 25 microns thick, said sheets held in close proximity to one another by said fasteners.

18. The thermal membrane of claim 15, wherein said relatively rigid panels each comprise:

at least one layer of carbon-filled thermal isolation material approximately 130 microns thick.

19. The thermal membrane of claim 15, wherein said relatively rigid panels each comprise:

three layers of carbon-filled thermal isolation material each of which is approximately 130 microns thick.

20. The thermal membrane of claim 15, wherein said first and second layers of isolation material are sized and spaced from each other to permit the ready operation of said hinge.

21. The thermal membrane of claim 20, wherein one of said first and second layers of isolation material includes sufficient excess material in the neighborhood of said hinge to permit a relatively wide-angle cornering of said hinge.

* * * * *